(12) United States Patent
Piccoli et al.

(10) Patent No.: US 10,502,275 B2
(45) Date of Patent: Dec. 10, 2019

(54) CALIPER BODY FOR A DISC BRAKE AND METHOD FOR MANUFACTURING A CALIPER BODY

(71) Applicant: FRENI BREMBO S.P.A., Curno, Bergamo (IT)

(72) Inventors: Mauro Piccoli, Curno (IT); Paulo Oldoni, Curno (IT); Alberto Previtali, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 15/750,263

(22) PCT Filed: Jul. 26, 2016

(86) PCT No.: PCT/IB2016/054452
§ 371 (c)(1),
(2) Date: Feb. 5, 2018

(87) PCT Pub. No.: WO2017/021817
PCT Pub. Date: Feb. 9, 2017

(65) Prior Publication Data
US 2018/0223924 A1    Aug. 9, 2018

(30) Foreign Application Priority Data

Aug. 5, 2015   (IT) .................. 102015000042449

(51) Int. Cl.
*F16D 65/00* (2006.01)
*B22F 3/105* (2006.01)
(Continued)

(52) U.S. Cl.
CPC ........ *F16D 65/0075* (2013.01); *B22F 3/1055* (2013.01); *B22F 7/06* (2013.01);
(Continued)

(58) Field of Classification Search
CPC ............... F16D 55/228; F16D 65/0075; F16D 65/0068; F16D 65/18; F16D 65/847;
(Continued)

(56) References Cited

U.S. PATENT DOCUMENTS 7,137,488 B2 * 11/2006 Gilliland ............... F16D 55/228
188/73.47
7,261,550 B2   8/2007 Herzog
(Continued)

FOREIGN PATENT DOCUMENTS

DE        19647999 A1     5/1998
EP         1521657 B1    11/2006
(Continued)

OTHER PUBLICATIONS

Anonymous: Tu Wien Racing; "Here are our topology optimized front and . . . "; Facebook post; XP055223237; URL: https://www.facebook.com/tuwracing/posts/10152229866921696, May 5, 2014, 3 pages.
(Continued)

*Primary Examiner* — Thomas W Irvin
(74) *Attorney, Agent, or Firm* — Marshall & Melhorn, LLC

(57) ABSTRACT

A caliper body for a disc brake is described. The caliper body is adapted to straddle an associable brake disc. The caliper body may have a first elongated portion, or a vehicle-side elongated portion, at least partially adapted to face the first braking surface. The caliper body may also have a second elongated portion, or wheel-side elongated portion, opposite to the first elongated portion and at least partially adapted to face the second braking surface. At least one part of the first elongated portion has at least a first module and at least one part of the second elongated portion has at least a second module. The first module and the
(Continued)

second module are obtained by at least one non-additive manufacturing technique.

9 Claims, 10 Drawing Sheets

(51) Int. Cl.
| | |
|---|---|
| B22F 7/06 | (2006.01) |
| B33Y 80/00 | (2015.01) |
| F16D 55/228 | (2006.01) |
| F16D 65/18 | (2006.01) |
| F16D 65/847 | (2006.01) |
| B33Y 10/00 | (2015.01) |
| F16D 55/00 | (2006.01) |
| F16D 65/78 | (2006.01) |
| F16D 121/04 | (2012.01) |

(52) U.S. Cl.
CPC ............ *B33Y 80/00* (2014.12); *F16D 55/228* (2013.01); *F16D 65/18* (2013.01); *F16D 65/847* (2013.01); *B33Y 10/00* (2014.12); *F16D 2055/002* (2013.01); *F16D 2065/788* (2013.01); *F16D 2121/04* (2013.01); *F16D 2200/0004* (2013.01); *F16D 2200/0082* (2013.01); *F16D 2250/0076* (2013.01)

(58) Field of Classification Search
CPC ....... F16D 2055/0016; F16D 2055/002; F16D 2065/788; F16D 2121/04; F16D 2200/004; F16D 2200/0082; F16D 2250/0076; B33Y 80/00; B33Y 10/00; B22F 7/06; B22F 3/1055; B22F 2005/002
See application file for complete search history.

(56) References Cited

U.S. PATENT DOCUMENTS

| | | | | |
|---|---|---|---|---|
| 7,815,022 | B2* | 10/2010 | Aydt | ............... F16D 55/00 |
| | | | | 188/71.1 |
| 8,336,681 | B2* | 12/2012 | Renz | ............... B22D 19/0009 |
| | | | | 188/73.1 |
| 9,062,883 | B2 | 6/2015 | Widener et al. | |
| 9,212,713 | B2 | 12/2015 | Preda et al. | |
| 9,334,909 | B2* | 5/2016 | Baumgartner | ........ F16D 55/226 |
| 9,475,468 | B2* | 10/2016 | Valle | ............... F16D 65/0068 |
| 9,737,929 | B2* | 8/2017 | Morais | ............... F16D 65/0068 |
| 9,791,004 | B2* | 10/2017 | Nanri | ............... B60T 1/065 |
| 9,915,310 | B2* | 3/2018 | Morris | ............... F16D 55/226 |
| 2006/0054425 | A1* | 3/2006 | Maehara | ............... F16D 55/226 |
| | | | | 188/71.1 |
| 2010/0170755 | A1* | 7/2010 | Biggs | ............... F16D 55/224 |
| | | | | 188/72.4 |
| 2016/0265362 | A1 | 9/2016 | Slavens et al. | |
| 2018/0119762 | A1* | 5/2018 | Smith | ............... F16D 65/0068 |
| 2018/0142746 | A1* | 5/2018 | Hodgkins | ............... B22F 3/1055 |

FOREIGN PATENT DOCUMENTS

| | | |
|---|---|---|
| WO | 2013/105010 A1 | 7/2013 |
| WO | 2013/121393 A1 | 8/2013 |
| WO | 2015/058043 A1 | 4/2015 |

OTHER PUBLICATIONS

European Patent Office, International Search Report with Written Opinion, dated Oct. 7, 2016, 11 pages, European Patent Office, Rijswijk, Netherlands.

* cited by examiner

CALIPER BODY FOR A DISC BRAKE AND METHOD FOR MANUFACTURING A CALIPER BODY

FIELD OF THE INVENTION

The present invention relates to a caliper body for a disc brake and to a method of manufacturing said caliper.

BACKGROUND ART

Caliper bodies for a disc brake are generally arranged straddling an associable brake disc having a first braking surface, or vehicle-side braking surface, and a second braking surface, or wheel-side braking surface, opposite to said first braking surface. Said caliper bodies generally comprise a first elongated portion, or vehicle-side elongated portion, at least partially adapted to face said first braking surface, and a second elongated portion, or wheel-side elongated portion, opposite to said first elongated portion and at least partially adapted to face said second braking surface.

Caliper bodies for a disc brake are generally made in one piece by means of molding, melting and/or material removal from a solid. The ducts for feeding brake fluid or cooling oil into the caliper body and the pad-housing seats associable with the caliper body, and the seats for receiving pad thrust means, such as for example cylinder-piston assemblies, are generally obtained by using foundry blanks or by removing material from the caliper body. An example of caliper body made by means of foundry techniques is known from document WO-2013-105010-A1 by the applicant.

Particularly for applications in the racing field, finishing operations are adapted to customize the caliper body so as to respond to the particular, specific needs of the type of race to be tackled.

However, removing material from a caliper body is a laborious operation because it requires to intervene on portions which are difficult to be accessed, e.g. the caliper body portions adapted to face an associable brake disc. It is often required to perform operations adapted to form undercut surfaces or recesses. on said portions.

For example, European patent EP-1521657-B1 shows a metal workpiece, adapted to be used preferably as a generic foundry blank, comprising a lower portion and an upper portion obtained by means of different manufacturing techniques. In particular, said upper portion is obtained by means of a sintering or metal powder melting process, while said lower portion is obtained by means of subtractive manufacturing techniques. Thereby, a foundry blank may be obtained, which comprises an upper portion of shape suited to obtain channels and cavities in the molten material.

International patent application WO-2015-058043-A1 and U.S. Pat. No. 9,062,883-B2 show products obtained in part by means of subtractive manufacturing techniques, such as for example foundry techniques, and in part by means of additive manufacturing techniques or in other words obtained in part by material layering. In particular, U.S. Pat. No. 9,062,883-B2 shows channels, adapted to allow the introduction of fluids therein, obtained layer by layer.

Known additive manufacturing techniques are, for example: 3D printing, selective laser sintering and selective powder melting.

It is thus felt the need to provide a caliper body for a disc brake which can be customized so as to satisfy contingent needs and manufacturing specifications, while ensuring accurate compliance with the geometric parameters established during the step of designing.

It is also felt the need to provide a method of manufacturing a caliper body for a disc brake, which is faster and more efficient than the known solutions, while ensuring compliance with the geometric parameters of the caliper body as well as satisfactory mechanical features of light weight of the caliper body and of resistance to the forces which are developed in operating conditions.

Solution

It is an object of the present invention to solve the drawbacks of the prior art and to provide a solution to the need of providing a caliper body for a disc brake as well as a method of manufacturing said caliper body, as defined in the appended claims.

These and other objects are achieved by a caliper body according to claim 1 and by a method according to claim 9.

Some advantageous embodiments are the object of the dependent claims.

By providing a caliper body comprising at least two detached modules obtained by means of at least one non-additive manufacturing technique, such as for example by means of melting or molding or material removal from a solid, and comprising at least one junction element, adapted to connect said two modules, obtained by means of an additive manufacturing technique, it is possible to ensure a high degree of customization and versatility to the caliper body while ensuring an initial high modularity of the semi-finished products and compliance with the geometric tolerances established during the step of designing at the same time.

In particular, by providing said at least two caliper body modules, adapted to face each other on opposite braking surfaces of a brake disc associable with the caliper body, it is possible to perform material removal processes on said modules before the caliper body is assembled in one piece. Thereby, the portions of said modules adapted to face said disc associable with the caliper are easy to be accessed, easy to be machined, and have even more extreme manufacturing tolerances. Afterward, said two appropriately processed modules are connected to each other to form the brake caliper in one piece by providing a junction element obtained by material layering by means of at least one additive manufacturing technique.

By providing removable equipment adapted to maintain said at least two caliper body modules in place while said junction element is obtained by means of an additive manufacturing technique, it is possible to ensure compliance with the geometric tolerances of the caliper body as a whole as established during the step of designing.

DRAWINGS

Further features and advantages of the caliper body for a disc brake as well as of the method of manufacturing said caliper body, according to the invention, will become apparent from the following description of preferred embodiments, given by way of non-limiting examples, with reference to the accompanying drawings, in which.

DESCRIPTION OF SOME PREFERRED EMBODIMENTS

Figure 1:
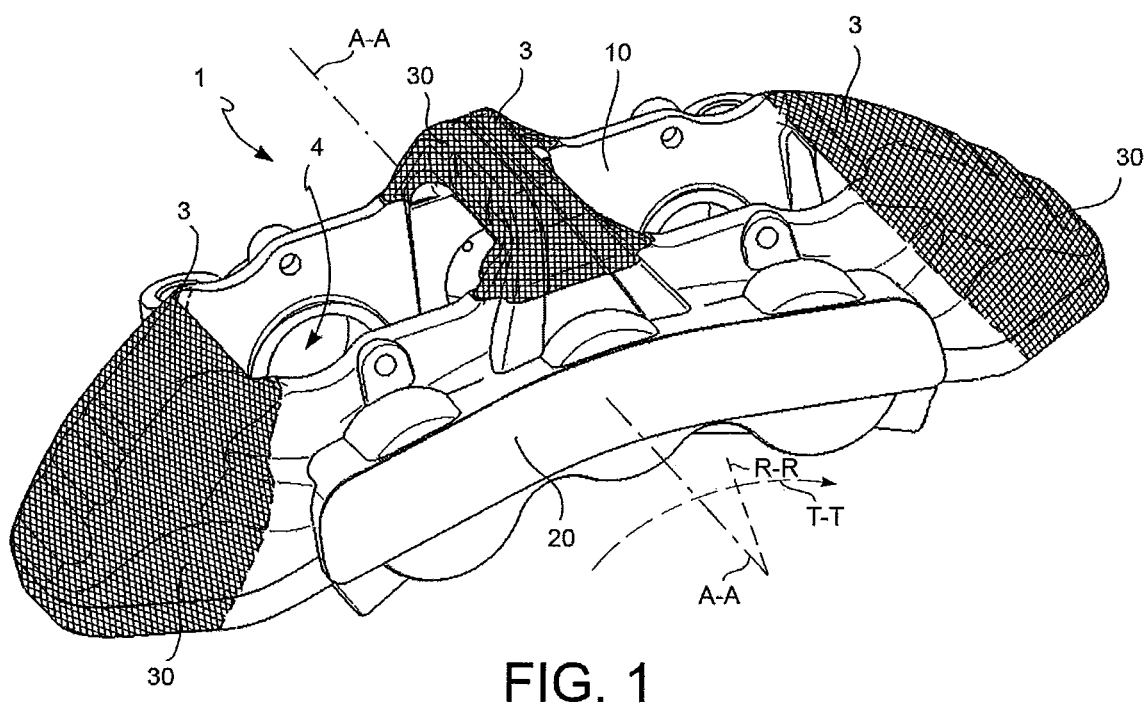
FIG. 1 is an axonometric view of a caliper body according to an embodiment of the invention.
Figure 9:
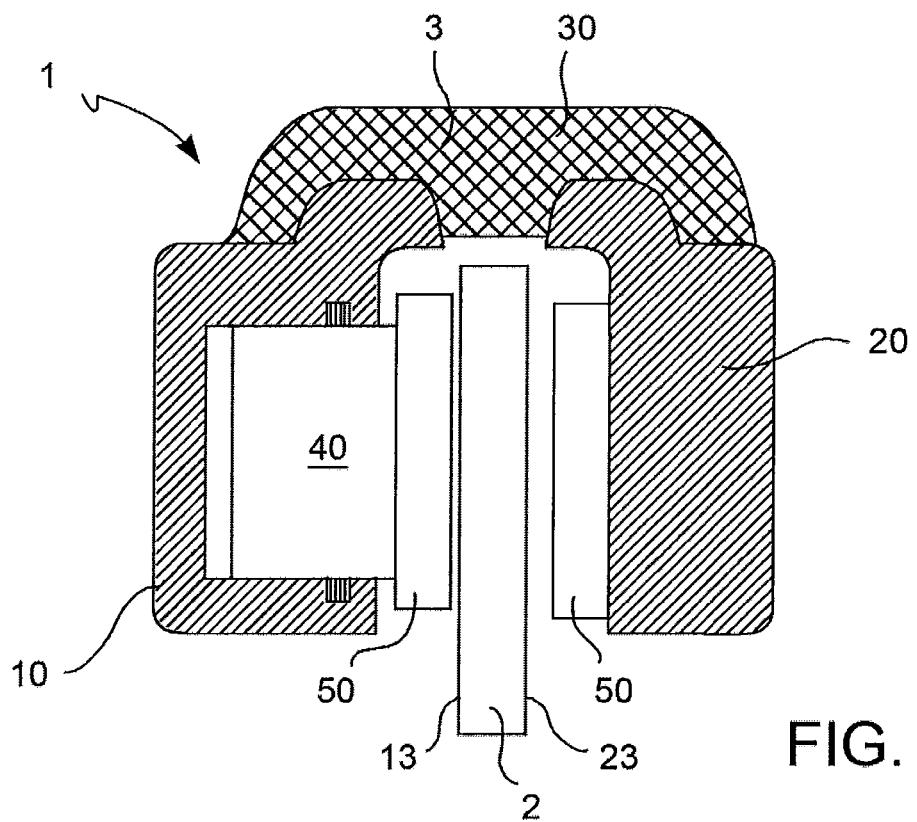
FIG. 9 is a diagrammatic section view of a caliper body according to an embodiment of the invention.
Figure 2:
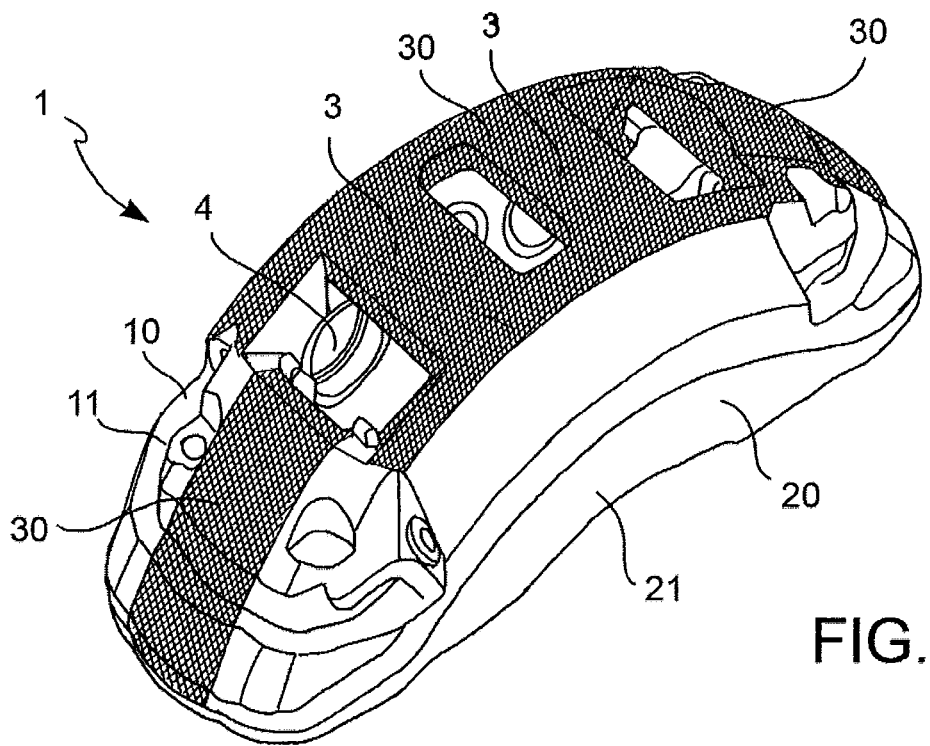
FIG. 2 is an axonometric view of a caliper body according to an embodiment of the invention.
Figure 3:
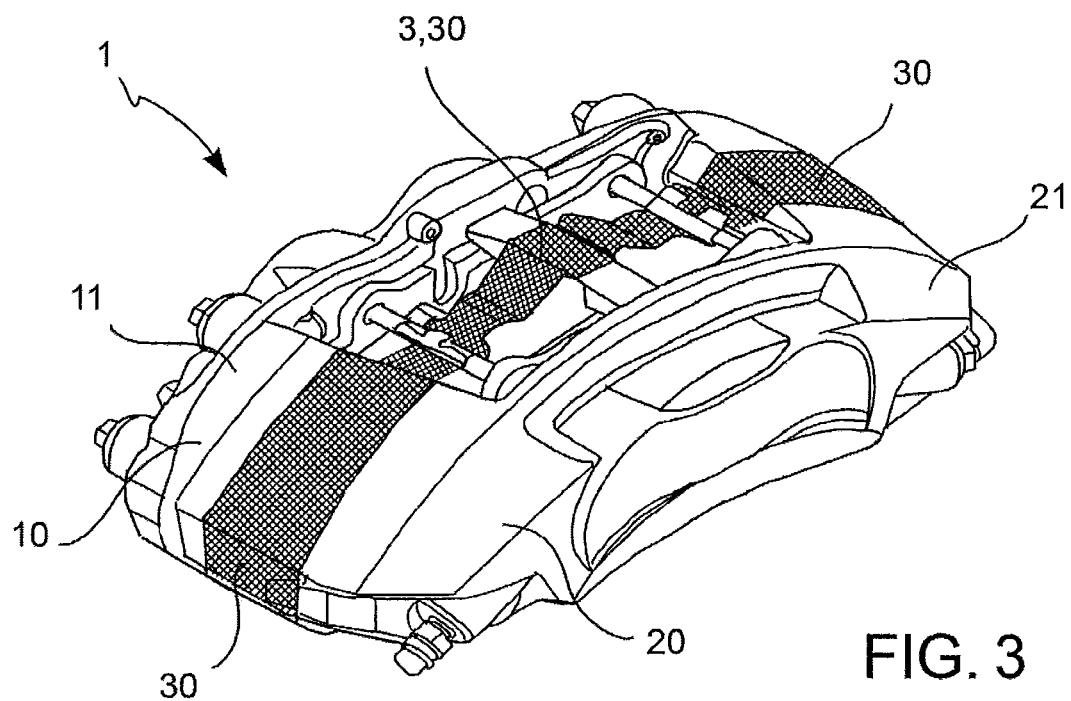
FIG. 3 is an axonometric view of a caliper body according to an embodiment of the invention.
Figure 4:
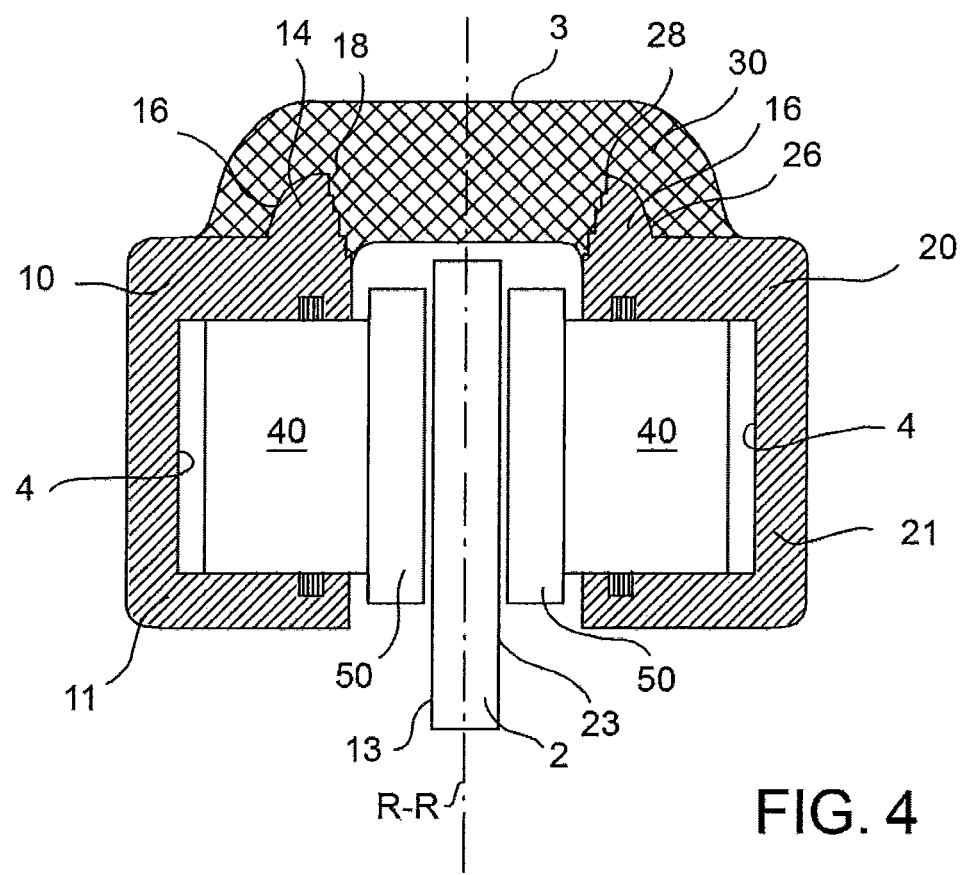
FIG. 4 is a diagrammatic section view of a caliper body according to an embodiment of the invention.
Figure 5:
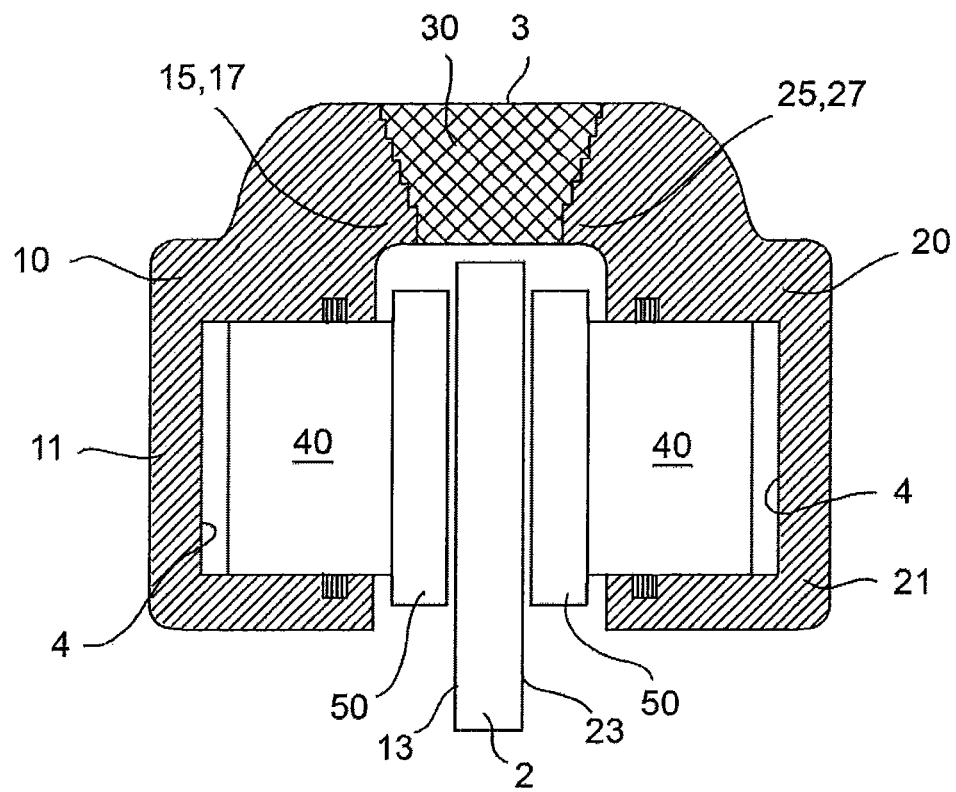
FIG. 5 is a diagrammatic section view of a caliper body according to an embodiment of the invention.
Figure 6:
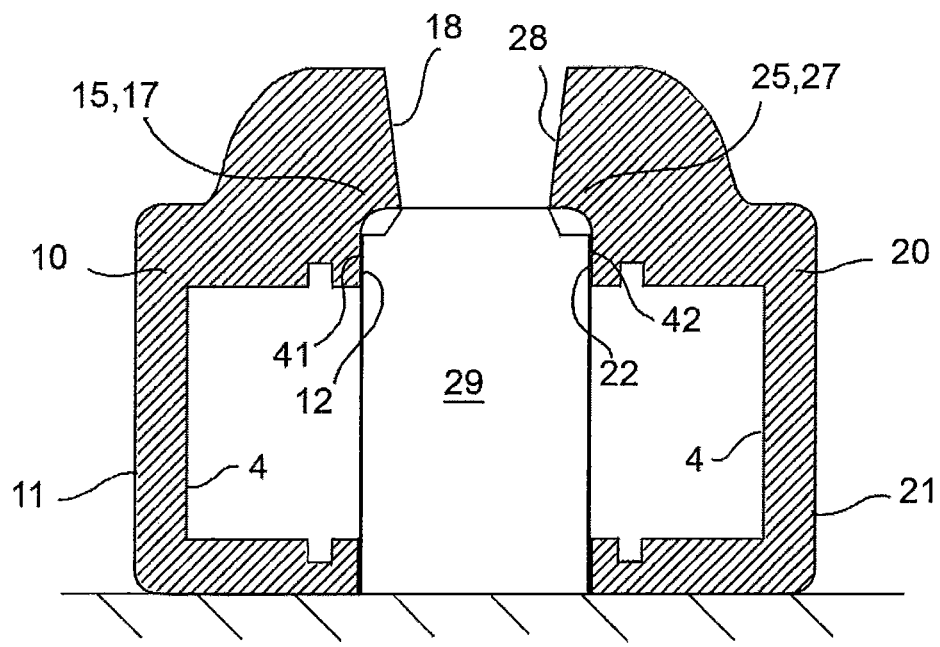
FIG. 6 is a diagrammatic section view of a manufacturing method of a caliper body according to an embodiment of the invention.
Figure 7:
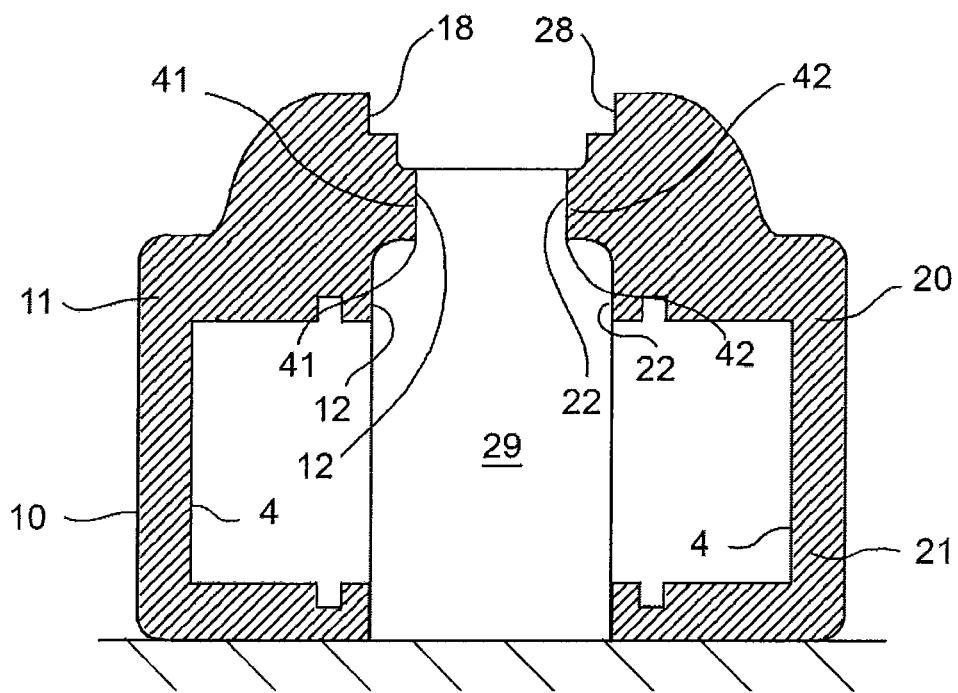
FIG. 7 is a diagrammatic section view of a manufacturing method of a caliper body according to an embodiment of the invention.
Figure 8:
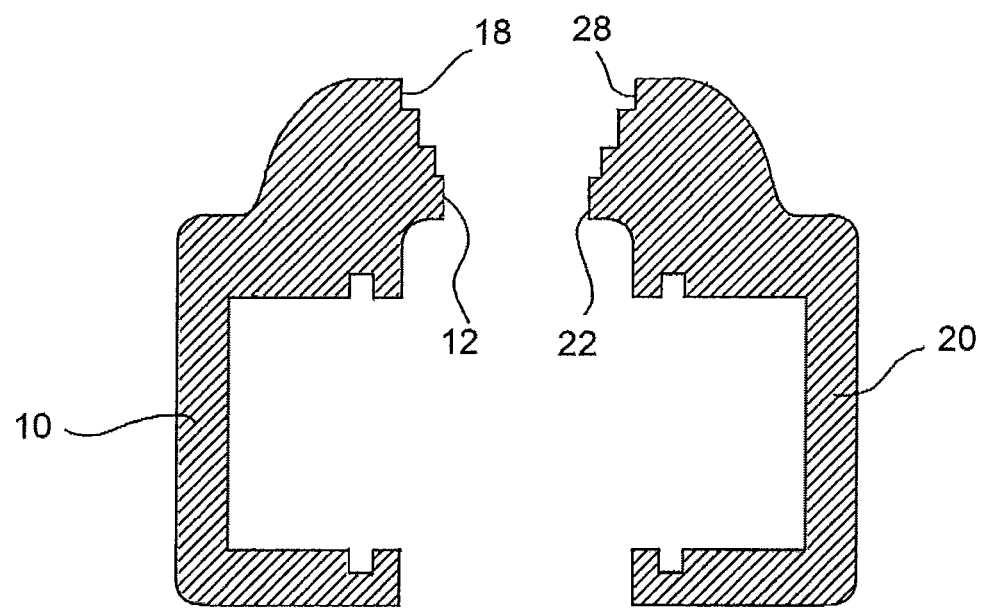
FIG. 8 is a diagrammatic section view of parts of a caliper body according to an embodiment of the invention.
Figure 10:
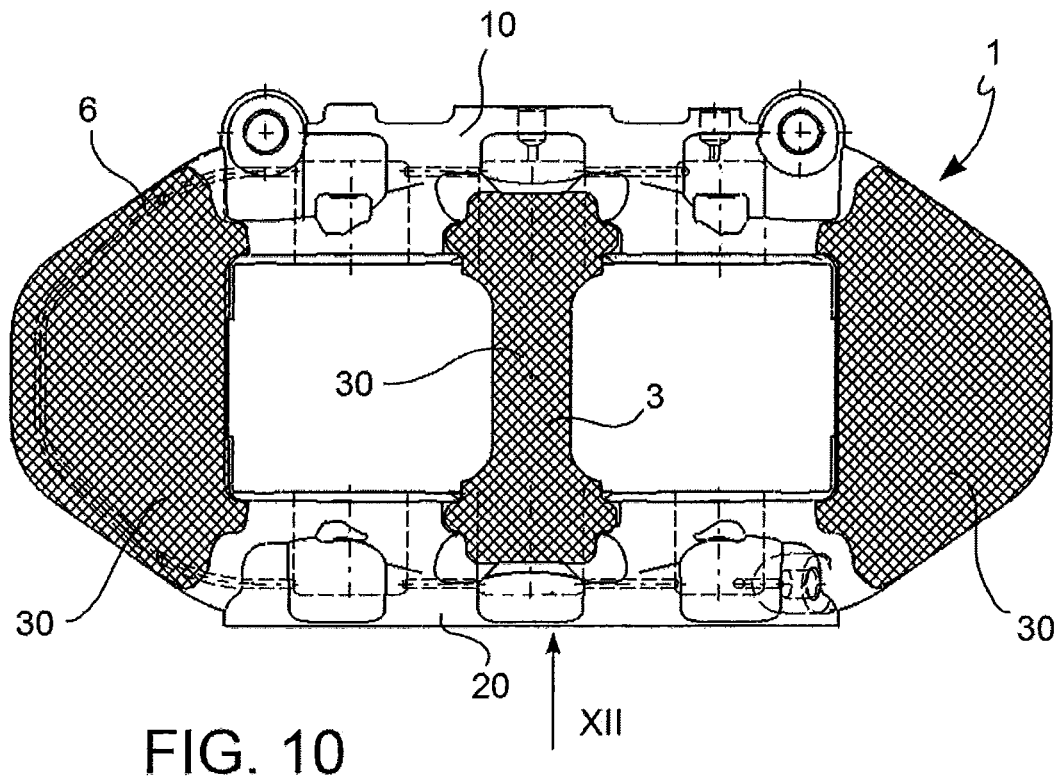
FIG. 10 is a plan view of a caliper body according to an embodiment of the invention.
Figure 11:
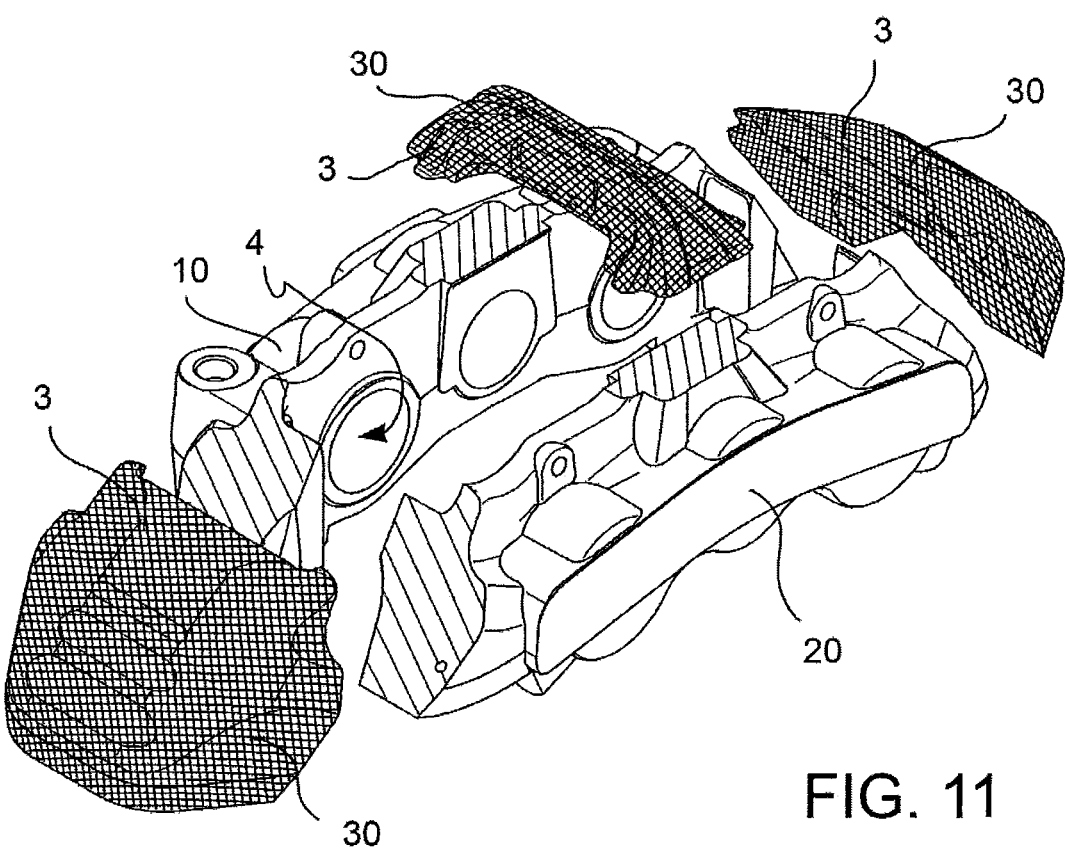
FIG. 11 is an axonometric view with parts separated of a caliper body according to an embodiment of the invention.
Figure 12:
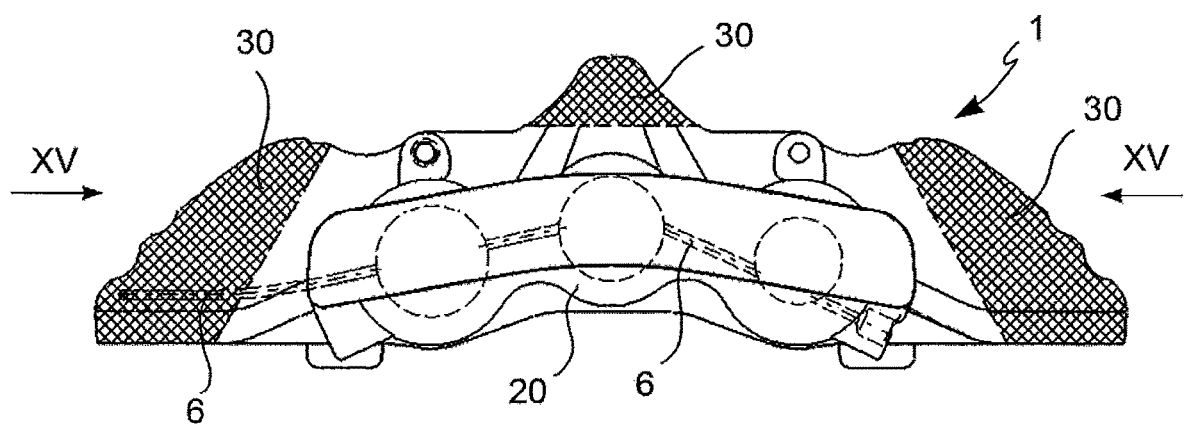
FIG. 12 is a vertical elevation view taken along the arrow XII in FIG. 10 of a caliper body according to an embodiment of the invention.
Figure 13:
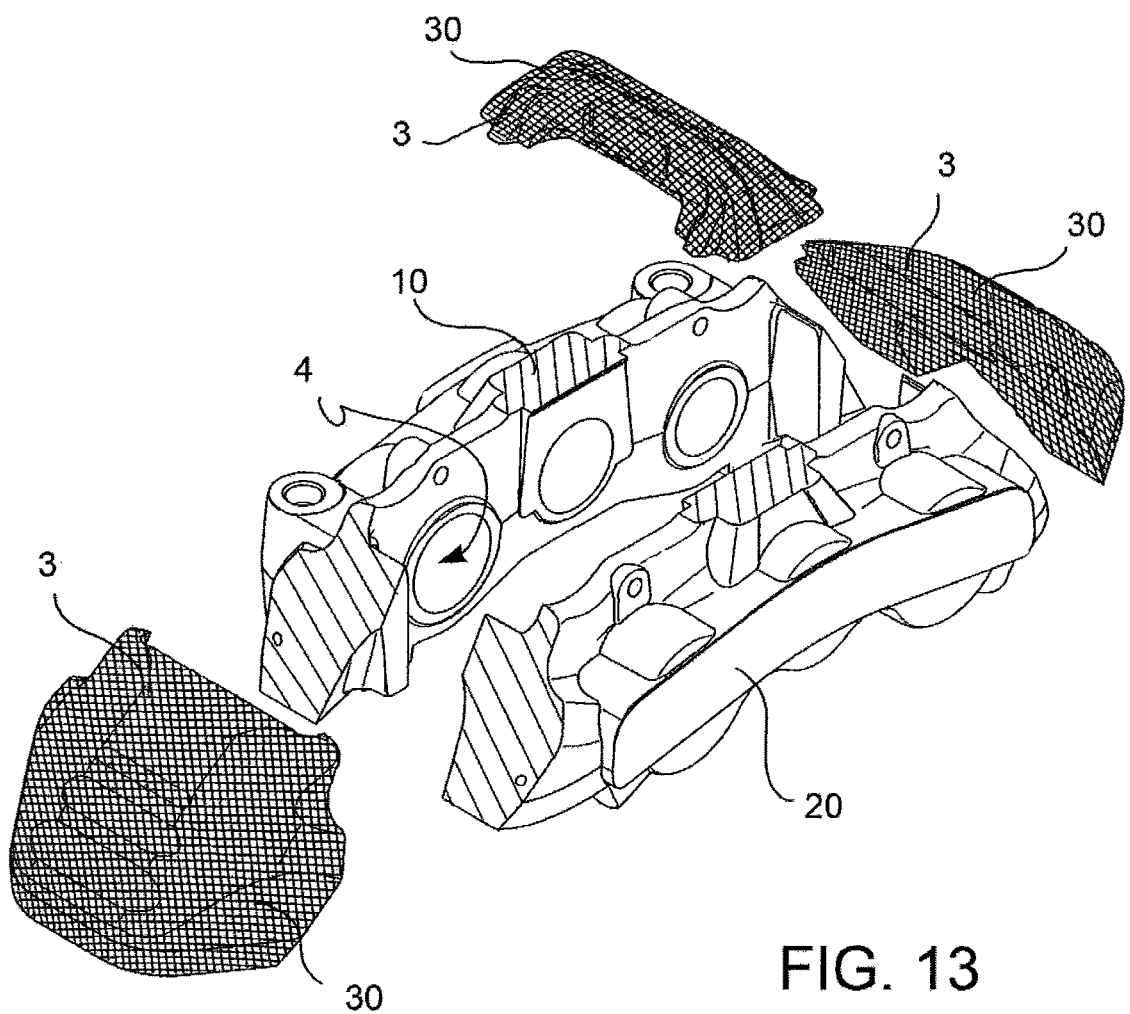
FIG. 13 is an axonometric view with parts separated of a caliper body according to an embodiment of the invention.
Figure 15A:
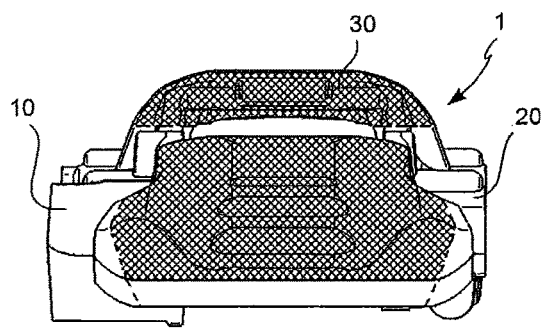
FIG. 15A is a vertical elevation view taken along the arrow XV in FIG. 12 of a caliper body according to an embodiment of the invention.
Figure 14A:
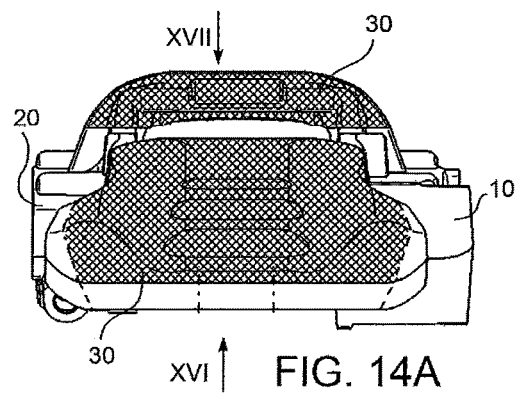
FIG. 14A is a vertical elevation view taken along the arrow XIV in FIG. 12 of a caliper body according to an embodiment of the invention.
Figure 15B:
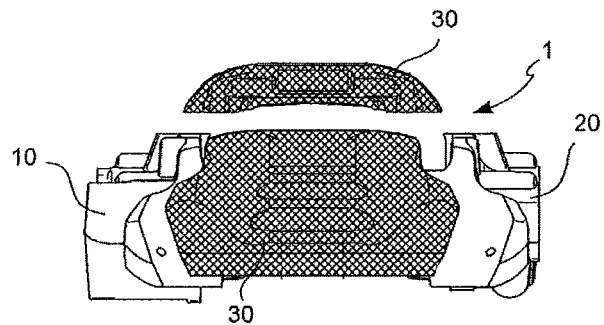
FIG. 15B is a view with parts separated of the caliper body in FIG. 15A.
Figure 14B:
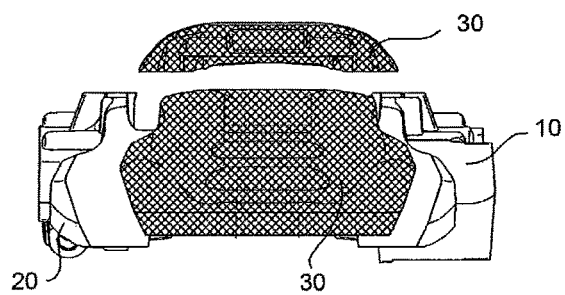
FIG. 14B is a view with parts separated of the caliper body in FIG. 14A.
Figure 17A:
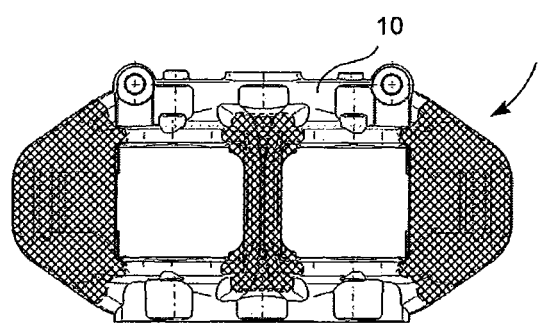
FIG. 17A is a plan view taken along the arrow XVII in FIG. 14A of a caliper body according to an embodiment of the invention.
Figure 16A:
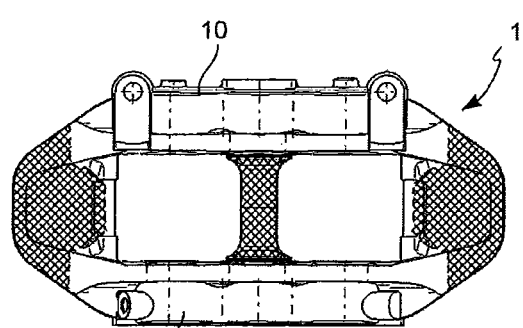
FIG. 16A is a plan view taken along the arrow XVI in FIG. 14A of a caliper body according to an embodiment of the invention.
Figure 17B:
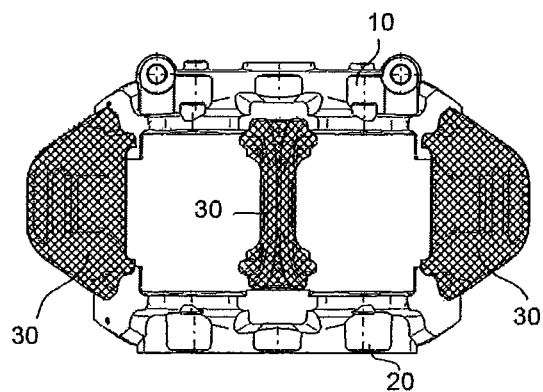
FIG. 17B is a view with parts separated of the caliper body in FIG. 17A.
Figure 16B:
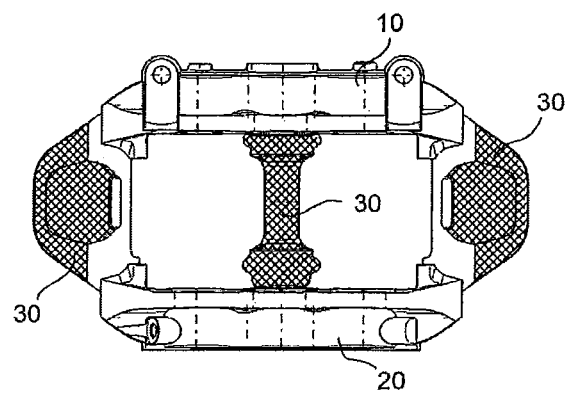
FIG. 16B is a view with parts separated of the caliper body in FIG. 16A.
Figure 18:
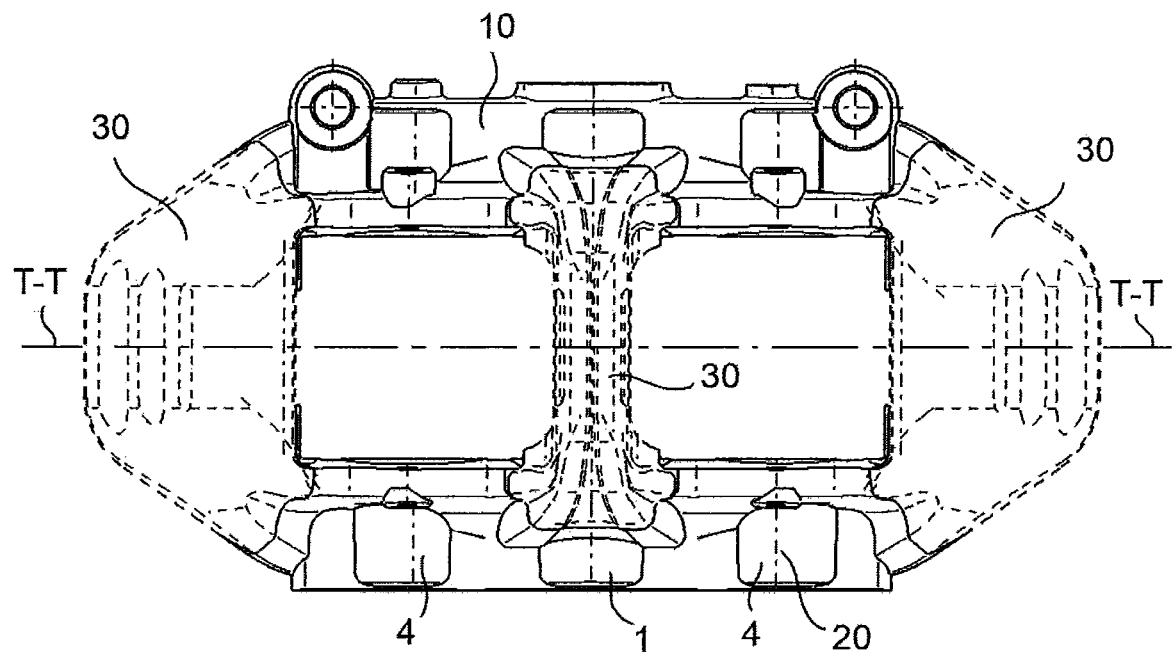
FIG. 18 is a plan view of a caliper body according to an embodiment of the invention in which the junction elements are shown outlined.
Figure 19A:
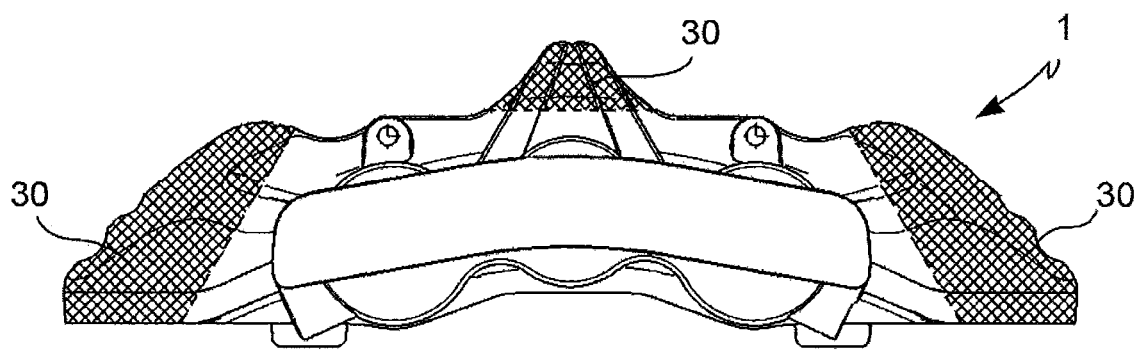
FIG. 19 is a vertical elevation view of a caliper body according to an embodiment of the invention.
FIG. 19B is a view with parts separated of the caliper body in FIG. 19A.
Figure 19B:
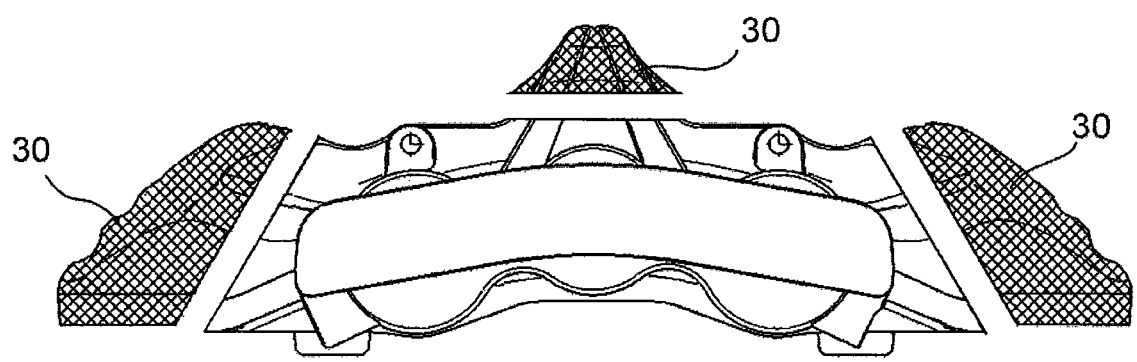

With reference to the figures, a caliper body for a disc brake is indicated as a whole by reference numeral 1.

According to a general embodiment, a caliper body 1 for a disc brake, where said caliper body 1 is adapted to straddle an associable brake disc 2 having a first braking surface 13, or a vehicle-side braking surface 13, and a second braking surface 23, or wheel-side braking surface 23, opposite to said first braking surface 13.

In said caliper body 1, an axial direction A-A either coinciding or parallel with the rotation axis of the disc, a radial direction R-R orthogonal with said axial direction A-A and a tangential direction T-T orthogonal to both said axial direction A-A and to said radial direction R-R are defined.

Said caliper body 1 comprises a first elongated portion 11, or vehicle-side elongated portion 11, at least partially adapted to face said first braking surface 13, and a second elongated portion 21, or wheel-side elongated portion 21, opposite to said first elongated portion 11 and at least partially adapted to face said second braking surface 23.

At least one part of said first elongated portion 11 consists of at least a first module 10, and at least one part of said second elongated portion 21 consists of at least a second module 20.

Said first module 10 and said second module 20 are obtained by means of at least one non-additive manufacturing technique. By way of non-limiting example, said first module 10 and said second module 20 are obtained by means of at least one of the following manufacturing techniques: melting, or molding, or material removal.

Said first module 10 comprises at least a first positioning surface 12 and where said second module 20 comprises at least a second positioning surface 22.

Said first positioning surface 12 and said second positioning surface 22 are adapted to be arranged substantially parallel to each other when facing each other. In other words, said first positioning surface 12 and said second positioning surface 22 are adapted to be arranged within a predetermined parallelism tolerance when facing each other.

According to an embodiment, said predetermined parallelism tolerance is expressed as an angular interval mutually formed by said parallelism surfaces 12, 22, measured with respect to the tangential direction T-T.

According to an embodiment, said parallelism surfaces 12, 22 are included in at least partially tapered caliper body portions.

Said caliper body 1 comprises at least one junction element 30 obtained by means of at least one additive manufacturing technique.

Said junction element 30 connects said first module 10 and said second module 20 to each other to form a single piece, blocking the relative position of said first module 10 and said second module 20 with said first and second positioning surfaces 12, 22 substantially parallel to each other.

According to an embodiment, said junction element 30 is adapted to maintain the geometric position of the modules so that braking is optimal, and where said first positioning surface 12 and said second positioning surface 22 mutually form an angle with respect to the tangential direction T-T, from −10° to +10°, and preferably from −5° to +5°.

According to an embodiment, said first positioning surface 12 and said second positioning surface 22 mutually form an angle with respect to the tangential direction T-T, from −1° to +1°, and preferably from −0.5° to +0.5°, and even more preferably from −0.1° to +0.1°.

The expression "angle with respect to the tangential direction T-T" means an angle formed between said first and second positioning surfaces 12,22 measured on a plane parallel to said tangential direction T-T and orthogonal to said radial direction R-R.

According to an embodiment, said first positioning surface 12 and said second positioning surface 22 are parallel to each other.

According to an embodiment, said junction element 30 is adapted to form at least partially at least one bridge 3, and where one bridge 30 is adapted to straddle the brake disc 2, when said caliper body 1 is assembled to the brake disc 2.

Advantageously, providing said first positioning surface 12 and second positioning surface 22 adapted to be arranged parallel to each other, when facing each other, ensures that said caliper body 1 is dimensioned so as to provide, in operating conditions, a precise braking action, and to prevent the onset of residual braking torque caused by geometric imbalance, or geometric misalignment, of the position of the caliper body portions adapted to face opposite braking surfaces of said associable brake disc.

Advantageously, at least either said first module 10 or said second module 20 is processed by material removal from a solid, before said junction element 30 is obtained so as to obtain at least one portion of at least one pad resting seat, and at least one portion of at least one seat adapted to house the thrust systems of an associable brake pad. Thereby, said material removal processing from a solid is preferred because said first and second modules 10, 20 are either detached or separate in this step, and are thus adapted to be positioned freely during the step of processing by material removal.

Advantageously, said junction element 30 adapted to form a single piece between said first module 10, said second module 20 and said junction element 30 itself is obtained after the material removal processes from said first and second module 10, 20.

Advantageously, providing said first and second modules 10, 20, adapted to be processed by material removal when detached allows to reduce the size of the pad-housing seats along the axial direction A-A with respect to a single block caliper body obtained by means of non-additive manufacturing techniques. Indeed, providing said first and second modules 10, 20, adapted to be processed by material removal when they are mutually detached avoids providing a region along the axial direction A-A adapted to accommodate the clearance of tools adapted to obtain cavities in the portions of the caliper body adapted to face the braking surfaces 13, 23 of an associable brake disc 2.

Advantageously, providing said junction element 30 obtained by means of an additive manufacturing technique allows to customize the size of said at least one bridge 3 along the axial direction A-A, so as to obtain caliper bodies in one single piece of different size along the axial direction A-A, adapted to be associated with brake discs which have a wide axial thickness range.

Advantageously, providing said junction element 30 obtained by means of an additive manufacturing technique allows to customize the extension of portions of said at least one bridge 3 along the radial direction R-R, e.g. the radial extension of bridge shoulder portions 17, 27, so as to obtain caliper bodies in one single piece adapted to be associated with brake discs which have a different radial extension.

According to an embodiment, said first module 10 comprises at least a first junction surface 18 and said second module 20 comprises at least a second junction surface 28, where first and second junction surfaces 18, 28 are adapted to be connected to each other by means of said junction element 30.

According to an embodiment, said first junction surface 18 and said second junction surface 28 are parallel to each other.

Providing said first junction surface 18 and said second junction surface 28 tapered allows to promote the deposition of material by means of an additive manufacturing technique to form said junction element 30.

According to an embodiment, said first and second junction surfaces 18, 28 are mutually opposite and face each other.

According to an embodiment, said first and second junction surfaces 18, 28 are mutually opposite.

According to an embodiment, said first and second junction surfaces 18, 28 are mutually non-parallel.

According to an embodiment, said first and second junction surfaces 18, 28 are arranged on a plane substantially orthogonal to the radial direction R-R.

According to an embodiment, said first and second junction surfaces 18, 28 are arranged in portions of the caliper body 1 adapted to be reached by material deposited by means of an additive manufacturing technique.

Providing said first and second junction surfaces 18, 28 arranged in positions of the caliper body 1 adapted to be reached by material deposited by means of an additive manufacturing technique, allows to obtain a caliper body 1 in a single piece starting from said first module 10 and said second module 20, mutually detached, by obtaining said first junction element 30, avoiding to leave undesired voids or gaps in portions of said caliper body 1.

According to an embodiment, said junction element 30 may comprise within cavities adapted to be obtained by means of an additive manufacturing technique.

According to an embodiment, said junction element 30 comprises at least one portion of a distribution duct, adapted to convey a fluid.

According to an embodiment, said distribution duct is adapted to put in fluid communication a portion of said first module 10 with a portion of said second module 20.

According to an embodiment, said distribution duct is a pad cooling air feeding duct (not shown in the figures) adapted to convey cooling air for said at least one brake pad 50 associable with the caliper body 1.

According to a first embodiment, said first module 10 comprises a first attachment portion 14, and where said second module 20 comprises a second attachment portion 24, and where said first attachment portion 14 and said second attachment portion 24 are tapered, and where said first attachment portion 14 comprises a first attachment surface 16 substantially arranged as an undercut with respect to the axial direction A-A, and where said second attachment portion 24 comprises a second attachment surface 26 substantially arranged as an undercut with respect to the axial direction A-A.

Providing said first attachment surface 14 and second attachment surface 24 tapered allows to promote the material layering to form said junction element 30. Similarly, said first parallelism surface 12 and said second parallelism surface 22 are tapered so as to promote the material layering to form said junction element 30. In other words, providing said first attachment surface 14 and said second attachment surface 24 tapered prevents obtaining side walls not adapted to allow material layering, such as, for example, walls or portions of caliper body arranged in regions which cannot be reached by a laser beam activator or plasma.

According to an embodiment, said first attachment portion 14 comprises at least a first attachment surface 16 substantially arranged as an undercut with respect to the axial direction A-A, and where said second attachment portion 24 comprises at least a second attachment surface 26 substantially arranged as an undercut with respect to the axial direction A-A.

According to an embodiment, said first attachment surface 16 and said second attachment surface 26 are opposite to each other.

According to an embodiment, said first attachment surface 16 and said second attachment surface 26 are not adapted to face each other.

According to an embodiment, said junction element 30 is adapted to either hoop or embrace or bind said first and second attachment surfaces 16, 26.

Providing a junction element 30 is adapted to perform a hooping or continuous or discontinuous binding action on at least portions of said first and second attachment surfaces 16, 26 and cooperates to maintaining said first and second modules 10, 20 effectively in place, thus acting as a geometric retaining element.

According to an embodiment, said first and second attachment portions 14, 24 are adapted to comprise mutually opposite surfaces and are undercut with respect to the axial direction A-A.

According to an embodiment, said first and second attachment portions 14, 24 are not adapted to comprise surfaces which are undercut with respect to the radial direction R-R. Said undercut surfaces with respect to the radial direction R-R could not be reached by the laser beam activator or plasma, and would thus be not adapted to allow material layering or material deposition by means of additive manufacturing techniques.

According to an embodiment, at least either said first module 10 or said second module 20 comprises at least one portion of a brake fluid distribution circuit 6.

According to an embodiment, at least either said first module 10 or said second module 20 comprises at least one pad-housing portion 5, adapted to receive at least one pad 50 associable with the caliper body 1.

According to an embodiment, at least either said first module 10 or said second module 20 comprises at least one portion of a thrust system seat 4, adapted to receive at least one portion of a thrust system 40 adapted to exert a thrust action on said pad 50 associable with the caliper body.

According to an embodiment, at least either said first module 10 or said second module 20 comprises at least one machining operation carried out by material removal.

According to an embodiment, said first module 10 comprises at least a first bulge 15, adapted to jut cantilevered from said first module 10 so as to form at least a first bridge shoulder portion 17.

According to an embodiment, first bulge 15 comprises said first positioning surface 12. In other words, according to an embodiment, said at least a first positioning surface is arranged on said first bulge 15.

According to an embodiment, said second module 20 comprises at least a second bulge 25, adapted to jut cantilevered from said second module 20 so as to form at least a second bridge shoulder portion 27.

According to an embodiment, said second bulge 25 comprises said second positioning surface 22. In other words, according to an embodiment, said at least a second positioning surface 22 is arranged on said second bulge 25.

Providing the portions of said first and second modules 10, 20, adapted to form said first and second bridge shoulder 17, 27, allows to obtain part of said bridge 3 by means of said junction element 30.

According to an embodiment, said junction element 30 comprises at least one from among: a porous portion or a reticular portion or a trabecular portion.

Providing at least one from among said porous or reticular or trabecular portions allows to obtain a caliper body with less contribution of material with respect to a caliper body entirely made of solid metal. Providing at least one from among said porous or reticular or trabecular portions allows to obtain a caliper body which has improved mechanical properties adapted to deal with the stress emerging when the caliper body 1 is in working conditions, the weight being equal, or which is lighter, the mechanical proprieties being equal.

Providing said at least one reticular portion allows to increase the thermal exchange surface of said junction element 30.

According to an embodiment, said junction element comprises at least one reticular portion comprising at least one reticular unit.

According to an embodiment, said reticular unit comprises a substantially cubic structure or micro-structure, where the material is mainly distributed on the edges of a cube and on segments which connect the vertices of said cube.

By providing a reticular structure as described above, an optimized material distribution is obtained capable of maximizing the improvement of mechanical properties adapted to deal with the stresses emerging when the caliper body 1 is in working conditions, the weight being equal, and to maximize the decrease of weight of the brake caliper 1 the mechanical properties being equal.

According to an embodiment, said junction element 30 is obtained by means of selective laser sintering of metal powders. According to an embodiment, said junction element 30 is obtained by melting of metal powders.

According to an embodiment, the additive manufacturing process of said junction element 30 comprises at least one plasma treatment. According to an embodiment, said junction element 30 is obtained by plasma welding.

According to an embodiment, said junction element 30 is adapted to form at least one floating portion of a brake caliper of the floating type. According to an embodiment, each said first and second modules 10, 20 is adapted to form a portion of a fixed caliper. Providing a junction element 30 as described above is not limited to a specific type of brake caliper, thus ensuring a high degree of construction versatility.

A manufacturing method of a caliper body 1 will now be described according to any of the embodiments described above.

A method for manufacturing a caliper body 1 according to any one of the embodiments described above, comprises the following steps, listed according to a preferred order:

(A) obtaining said first module 10 and said second module 20 by means of at least one non-additive manufacturing technique and in any order;

(B) carrying out at least one machining operation by material removal from said first module 10 and/or from said second module 20;

(C) obtaining said junction element 30 by means of additive manufacturing technique so that it is in a single piece with said first module 10 and with said second module 20.

According to a possible mode of operation, the method comprises between step B and step C, the further step of arranging said first and second modules 10, 20 so as to maintain the geometric position of the modules 10, 20 so that the braking is optimal. In other words, providing said first and second module 10, 20 so as to maintain the geometric position of the modules 10, 20 within said predetermined parallelism tolerance.

According to a possible mode of operation, a method comprises, between step B and step C, the further step of arranging said first and second module 10, 20 so that said first positioning surface 12 of said first module 10 and said second positioning surface 22 of said second module 20 mutually form an angle with respect to the tangential direction T-T from −10° to +10°, and preferably from −5° to +5°.

According to a possible mode of operation, a method comprises, between step B and step C, the further step of arranging said first and second modules 10, 20 so that said first positioning surface 12 of said first module 10 and said second positioning surface 22 of said second module 20 mutually form an angle with respect to the tangential direction T-T from −0.1° to +0.1°, and preferably from −0.5° to +0.5°, and even more preferably from −0.1° to +0.1°.

According to a possible mode of operation, the method comprises, between step B and step C, the further step of providing at least one piece of removable equipment 29, adapted to maintain said first positioning surface 12 and said second positioning surface 22 facing each other and substantially parallel.

According to a possible mode of operation, said junction element 30 is obtained layer by layer.

According to a possible mode of operation, said junction element 30 is obtained between two tapered surfaces facing each other.

According to an embodiment, said removable equipment 29 comprises at least one mold.

According to an embodiment, said removable equipment 29 comprises at least one support, adapted to support at least one portion of said junction element 30, while said junction element 30 is obtained by means of an additive manufacturing technique.

According to an embodiment, said removable equipment 29 comprises at least a first supporting surface 41, adapted to face and adhere to at least one portion of said first positioning surface 12, and at least a second supporting surface 42, adapted to face and adhere to at least one portion of said second positioning surface 22, so as to maintain said first positioning surface 12 and said second positioning surface 22 parallel.

A person skilled in art may make several changes and adaptations to the above-described embodiments, or may replace elements with others which are functionally equivalent, in order to meet contingent, specific needs without however departing from the scope of the appended claims.

LIST OF REFERENCES

| | |
|---|---|
| 1 | Caliper body |
| 2 | Brake disc |
| 3 | Bridge |
| 4 | Thrust system seat |
| 5 | Pad-housing portion |
| 6 | Brake fluid distribution circuit |
| 10 | First module |
| 11 | First elongated portion of caliper body |
| 12 | First positioning surface |
| 13 | First braking surface of brake disc |
| 14 | First attachment portion of first module |
| 15 | First bulge of first module |
| 16 | First attachment surface of first module |
| 17 | First bridge shoulder portion |
| 18 | First junction surface |
| 20 | Second module |
| 21 | Second elongated portion of caliper body |
| 22 | Second positioning surface |
| 23 | Second braking surface of brake disc |
| 24 | Second attachment portion of second module |
| 25 | Second bulge of second module |
| 26 | Second attachment surface of second module |
| 27 | Second bridge shoulder portion |
| 28 | Second junction surface |
| 29 | Removable equipment |
| 30 | Junction element |

-continued

LIST OF REFERENCES

| | |
|---|---|
| 40 | Thrust system |
| 41 | First supporting surface of removable equipment |
| 42 | Second supporting surface of removable equipment |
| 50 | Brake pad |
| A-A | Axial direction |
| R-R | Radial direction |
| T-T | Tangential direction |

The invention claimed is:

1. A method for manufacturing a caliper body, comprising the following steps, listed according to a preferred order:
   (A) obtaining a first module and a second module by at least one non-additive manufacturing technique;
   (B) carrying out at least one machining operation by material removal from said first module and/or from said second module;
   (C) obtaining a junction element via laser sintering of layers of metal powders so that it is a single piece with said first module and with said second module;
   wherein said junction element is suspended by its sides between the first and second modules and
   between the step (B) and the step (C), providing at least one removable equipment, suitable for maintaining said first positioning surface and said second positioning surface facing each other and substantially parallel.

2. A method for manufacturing a caliper body for a disc brake, wherein said caliper body is suitable for straddling an associable disc brake having a first braking surface, or a vehicle-side braking surface, and a second braking surface, or wheel-side braking surface, opposite said first braking surface, further comprising:
   defining an axial direction coinciding or parallel with the rotation axis of the disc, a radial direction orthogonal with said axial direction and a tangential direction orthogonal both to said axial direction and to said radial direction;
   providing said caliper body with a first elongated portion, or vehicle-side elongated portion, at least partially suitable for facing said first braking surface and a second elongated portion, or wheel-side elongated portion, opposite said first elongated portion and at least partially suitable for facing said second braking surface;
   wherein at least one part of said first elongated portion is constituted by at least one first module and at least one part of said second elongated portion is constituted by at least one second module,
   wherein said first module and said second module are obtained by at least one non-additive manufacturing technique,
   wherein said first module comprises at least one first positioning surface and wherein said second module comprises at least one second positioning surface,
   wherein said first positioning surface and said second positioning surface are suitable for being arranged, when facing, substantially parallel to each other,
   wherein said caliper body comprises at least one junction element obtained by laser sintering of layers of metal powders,
   and wherein said junction element connects said first module and said second module to each other to form a single piece, blocking the relative position of said first module and said second module with said first and second positioning surfaces substantially parallel to each other, wherein said junction element is only supported on its sides between the first and second modules.

3. The method according to claim 2, wherein said junction element is suitable for maintaining the geometric position of the modules so that the braking is optimal, and wherein said first positioning surface and said second positioning surface together form an angle with respect to the tangential direction comprised between −10° and +10°.

4. The method according to claim 2, wherein said first module comprises a first attachment portion, and wherein said second module comprises a second attachment portion, and wherein said first attachment portion and said second attachment portion are tapered, and wherein said first attachment portion comprises at least one first attachment surface arranged substantially as an undercut with respect to the axial direction for said second module, and wherein said second attachment portion comprises at least one second attachment surface, arranged as an undercut with respect to the axial direction for said first module;

and wherein said first attachment surface and said second attachment surface are opposite each other, and wherein said junction element is suitable for hooping, or embracing, said first and second attachment surfaces.

5. The method according to claim 2, wherein at least one of said first module and said second module comprises at least one of the following:

at least one portion of a brake fluid distribution circuit;

at least one pad-housing portion, suitable for receiving at least one pad associable with the caliper body;

at least one portion of a thrust system seat, suitable for receiving at least one portion of a thrust system suitable for exerting a thrust action on said pad associable with the caliper body;

at least one machining operation carried out by material removal.

6. The method according to claim 2, wherein said first module comprises at least one first junction surface and said second module comprises at least one second junction surface, and wherein said first and second junction surfaces are suitable for being connected to each other by means of said junction element; and/or wherein said first and second junction surfaces are opposite and facing each other; and/or wherein said first and second junction surfaces are arranged in a plane substantially orthogonal to the radial direction; and/or wherein said junction element connects said first and second junction surfaces to each other; and/or wherein said first positioning surface and said second positioning surface form together an angle with respect to the tangential direction comprised between −1° and +1°.

7. The method according to claim 2, wherein said junction element is suitable to form at least one bridge, and wherein said bridge is suitable for straddling the brake disc, when said caliper body is assembled to the brake disc; and/or wherein said first module comprises at least one first bulge, suitable for jutting cantilevered from said first module so as to form at least one first bridge shoulder portion; and/or wherein said first bulge comprises said first positioning surface; and/or wherein said second module comprises at least one second bulge, suitable for jutting cantilevered from said second module so as to form at least one second bridge shoulder portion; and/or wherein said second bulge comprises said second positioning surface; and/or wherein said junction element comprises at least one portion of a distribution duct, suitable for conveying a fluid; and/or wherein said distribution duct is suitable for putting in fluid communication a portion of said first module with a portion of said second module; and/or wherein said distribution duct is a conduct for supplying air for cooling the pads, suitable for conveying cooling air for example for said at least one brake pad associable with the caliper body.

8. The method according to claim 2, wherein said junction element comprises at least one from among:

a porous portion, a reticular portion, a trabecular portion;

and/or wherein said junction element comprises at least one reticular portion comprising at least one reticular unit; and/or wherein said reticular unit comprises a structure, or a microstructure, substantially cubic, in which the material is distributed mainly on the edges of a cube and on segments, tie bars or struts connecting the vertices of said cube.

9. The caliper body according to claim 2, wherein said junction element is suitable for forming at least one floating portion of a brake caliper of the floating type; and/or wherein each of said first and second module is suitable for forming a portion of a fixed caliper; and/or wherein at least one of said first module and said second module is obtained by at least one of the following non-additive manufacturing techniques:

melting, molding, material removal.

* * * * *